(12) United States Patent
Takahashi et al.

(10) Patent No.: US 12,052,708 B2
(45) Date of Patent: Jul. 30, 2024

(54) USER TERMINAL AND BASE STATION

(71) Applicant: NTT DOCOMO, INC., Tokyo (JP)

(72) Inventors: Hideaki Takahashi, Tokyo (JP); Kazuki Takeda, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 608 days.

(21) Appl. No.: 17/280,466

(22) PCT Filed: Sep. 28, 2018

(86) PCT No.: PCT/JP2018/036569
§ 371 (c)(1),
(2) Date: Mar. 26, 2021

(87) PCT Pub. No.: WO2020/066013
PCT Pub. Date: Apr. 2, 2020

(65) Prior Publication Data
US 2021/0360665 A1    Nov. 18, 2021

(51) Int. Cl.
| | |
|---|---|
| *H04L 1/00* | (2006.01) |
| *H04L 1/1607* | (2023.01) |
| *H04L 5/00* | (2006.01) |
| *H04W 72/0453* | (2023.01) |
| *H04W 72/1273* | (2023.01) |
| *H04W 72/23* | (2023.01) |

(52) U.S. Cl.
CPC ....... *H04W 72/1273* (2013.01); *H04L 1/0067* (2013.01); *H04L 1/1671* (2013.01); *H04L 5/0053* (2013.01); *H04L 5/0092* (2013.01); *H04W 72/0453* (2013.01); *H04W 72/23* (2023.01)

(58) Field of Classification Search
CPC ......... H04W 72/1273; H04W 72/0453; H04W 72/23; H04W 48/12; H04L 1/0067; H04L 1/1671; H04L 5/0053; H04L 5/0092; H04L 5/0094; H04L 5/003; H04L 27/2601
See application file for complete search history.

(56) References Cited

U.S. PATENT DOCUMENTS

2019/0174567 A1* 6/2019 Kusashima ........... H04L 5/0053
2021/0185679 A1* 6/2021 Yoshimura ........... H04L 5/0053

OTHER PUBLICATIONS

Extended European Search Report issued in counterpart European Patent Application No. 18935523.3, mailed on Apr. 22, 2022 (7 pages).
NTT Docomo, Inc.; "Maintenance for physical downlink control channel"; 3GPP TSG RAN WG1 Meeting #94, R1-1809141; Gothenburg, Sweden; Aug. 20-24, 2018 (27 pages).

(Continued)

*Primary Examiner* — Joseph E Dean, Jr.
(74) *Attorney, Agent, or Firm* — Osha Bergman Watanabe & Burton LLP

(57) ABSTRACT

A user terminal according to one aspect of the present disclosure includes a receiving section that receives downlink control information including a given field indicating a frequency domain resource assigned to a downlink shared channel, and a control section that controls reception of the downlink shared channel based on whether or not a control resource set for a common search space is configured based on a master information block (MIB).

10 Claims, 8 Drawing Sheets

(56) References Cited

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
International Search Report for corresponding International Application No. PCT/JP2018/036569, mailed Oct. 30, 2018 (8 pages).
Written Opinion for corresponding International Application No. PCT/JP2018/036569, mailed Oct. 30, 2018 (3 pages).
Office Action issued in the counterpart Indian Patent Application No. 202117018468, mailed on Nov. 3, 2022 (5 pages).
MediaTek Inc.; "Summary of Bandwidth Part Remaining Issues"; 3GPP TSG RAN WG1 Meeting #94, R1-1809929; Gothenburg, Sweden; Aug. 20-24, 2018 (22 pages).

\* cited by examiner

USER TERMINAL AND BASE STATION

TECHNICAL FIELD

The present disclosure relates to a user terminal and a base station in next-generation mobile communication systems.

BACKGROUND ART

In the universal mobile telecommunications system (UMTS) network, long term evolution (LTE) has been specified for the purpose of further increasing a data rate, providing low latency, and the like (see Non-Patent Literature 1). In addition, LTE-Advanced (Third Generation Partnership Project (3GPP) Rel. (Release) 10 to 14) has been specified for the purpose of further increasing capacity, sophistication, and the like of LTE (3GPP Rel. 8 and 9).

Successor systems to LTE (for example, also referred to as 5th generation mobile communication system (5G), 5G+ (plus), new radio (NR), or 3GPP Rel. 15 or later, and the like) are also being studied.

In initial access in NR, at least one of detection of a synchronization signal block (SSB), acquisition of broadcast information (for example, a master information block (MIB)) transmitted by a physical broadcast channel (PBCH, also referred to as P-BCH or the like), and establishment of connection by random access is performed.

Here, SSB is a signal block including at least one of a synchronization signal (for example, a primary synchronization signal (PSS) and a secondary synchronization signal (SSS)) and PBCH, and is also called an SS/PBCH block or the like.

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010

SUMMARY OF INVENTION

Technical Problem

In radio communication systems (hereinafter also referred to as NR), it is assumed that a control resource set (CORESET) (CORESET #0, also called a type 0-PDCCH CSS, or the like) for a search space (common search space (CSS)) common to one or more user terminals (user equipment (UE)) is configured in a UE. For example, the CORESET #0 is being considered to be configured based on a parameter in the MIB (for example, pdcch-ConfigSIB1).

However, when the CORESET #0 is not configured based on the parameter in the MIB (for example, pdcch-ConfigSIB1), reception processing (for example, at least one of reception, demodulation, decoding, rate matching, or the like) of a downlink shared channel (for example, PDSCH) within a band (for example, initial downlink bandwidth part (BWP)) for initial access may not be properly controlled.

Therefore, one of objects of the present disclosure is to provide a user terminal and a base station capable of appropriately controlling the reception processing of the downlink shared channel.

Solution to Problem

A user terminal according to one aspect of the present disclosure includes a receiving section that receives downlink control information including a given field indicating a frequency domain resource assigned to a downlink shared channel, and a control section that controls reception of the downlink shared channel based on whether or not a control resource set for a common search space is configured based on a master information block (MIB).

Advantageous Effects of Invention

According to one aspect of the present disclosure, reception processing of a downlink shared channel can be appropriately controlled.

DESCRIPTION OF EMBODIMENTS

Future radio communication systems (hereinafter also referred to as NR) use carriers (for example, 100 to 400 MHz) having a wider bandwidth than the carriers (for example, 20 MHz) of existing LTE systems (for example, Rel. 8 to 13). Thus, it is considered to configure partial one or more bands in the carrier for a UE and perform communication using at least one of the one or more bands.

The carrier is also called a component carrier (CC), a cell, a serving cell, a system bandwidth, or the like. Further, the partial band in the carrier is called, for example, a bandwidth part (BWP) or the like. The BWP may include a BWP for uplink (uplink BWP) and a BWP for downlink (downlink BWP).

For example, the UE is configured with one or more BWPs (one or more uplink BWPs and one or more downlink BWPs), and at least one of the configured BWPs may be activated. An activated BWP is also called an active BWP or the like.

Further, a BWP for initial access (initial BWP) may be configured for the UE. The initial BWP may include at least one of an initial BWP for downlink (initial downlink BWP, initial DL bandwidth part) and an initial BWP for uplink (initial uplink BWP).

In the initial access, at least one of detection of a synchronization signal, acquisition of broadcast information (for example, a master information block (MIB)), or establishment of connection by random access may be performed.

A bandwidth of the initial BWP may be configured based on an index (also called pdcch-ConfigSIB1, RMSI-PDCCH-Config, or the like) in the MIB transmitted via a physical broadcast channel (PBCH, also referred to as P-BCH, or the like).

Figure 1:
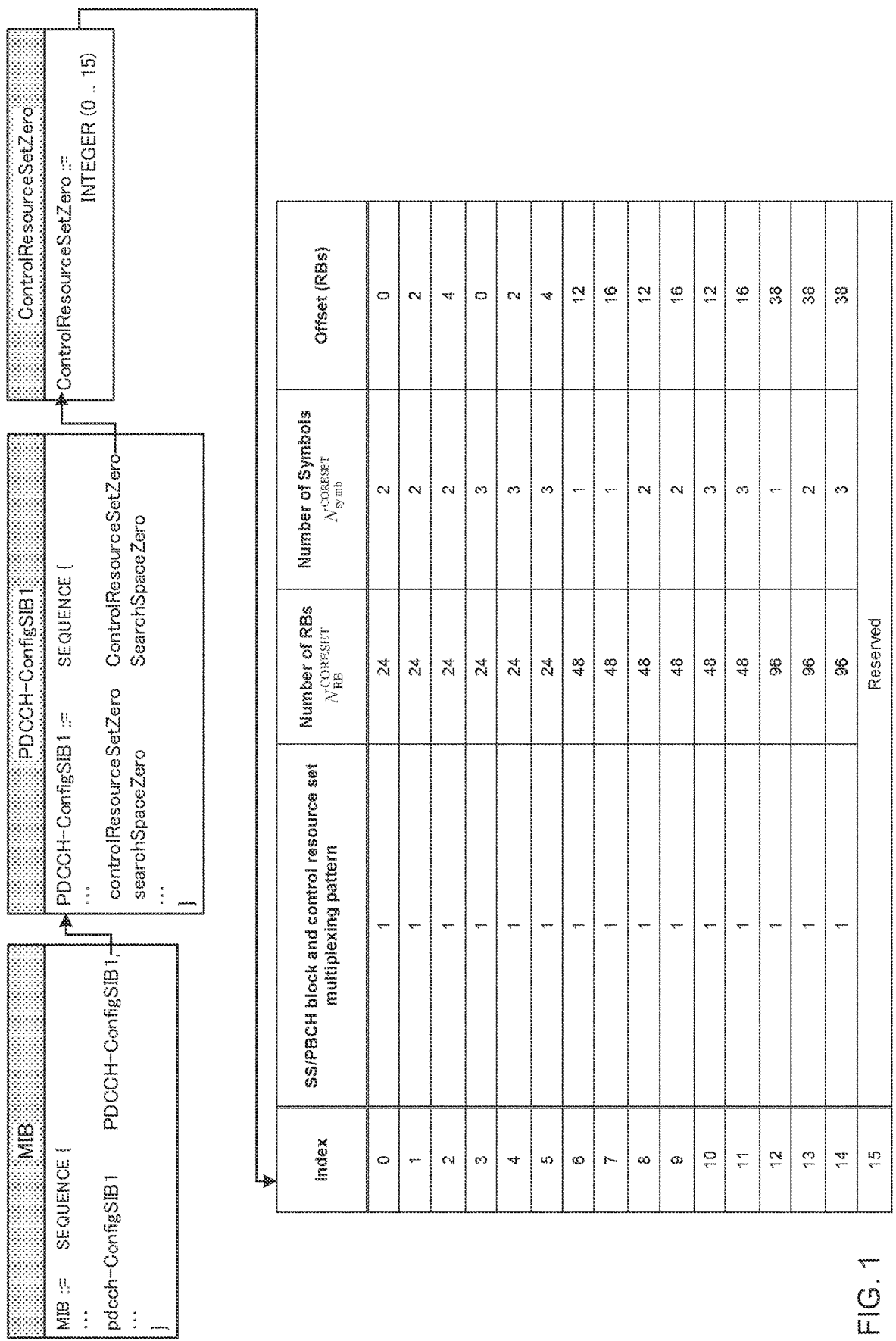
FIG. 1 is a diagram illustrating an example of a configuration of a CORESET #0 based on an MIB.

FIG. 1 is a diagram illustrating an example of determining the bandwidth of the initial BWP based on the MIB. As illustrated in FIG. 1, the MIB may include configuration information (also referred to as pdcch-ConfigSIB1 or RMSI-PDCCH-Config, or the like) regarding PDCCH for system information (for example, SIB1, RMSI, or the like). Note that the parameters in the MIB illustrated in FIG. 1 and the hierarchical structure of the parameters are only examples, and a part of parameters (layers) may be omitted or added.

As illustrated in FIG. 1, the pdcch-ConfigSIB1 in the MIB may include information used to configure the initial BWP (ControlResourceSetZero, also referred to as a given number of most significant bits (MSB) (for example, 4 MSB) or the like). For example, in FIG. 1, the UE may determine the bandwidth of the initial BWP based on the number of RBs ($N^{CORESET}_{RB}$) associated with an index indicated by ControlResourceSetZero in the pdcch-ConfigSIB1.

Further, the bandwidth of the initial BWP may be replaced with the number of RBs constituting a given control resource set (CORESET). Here, the CORESET is an assignment candidate area of a physical downlink control channel (for example, a physical downlink control channel (PDCCH)). One or more search spaces may be configured in the CORESET, and DCI monitoring (blind decoding) by the UE may be performed in the search space.

The search space may include a (cell-specific) search space used for monitoring DCI common to one or more UEs (common search space (CSS)) and a UE-specific search space used for monitoring DCI (user-specific search space (USS)).

The CSS may include a search space used to monitor a (CRC scrambled) DCI with a cyclic redundancy check (CRC) bit scrambled with a given radio network temporary identifier (RNTI) in a given cell.

The given RNTI may include, for example, system information-RNTI (SI-RNTI), random access-RNTI (RA-RNTI), temporary cell-RNTI (TC-RNTI), paging-RNTI (P-RNTI), interruption RNTI (INT-RNTI) for DL preemption instruction, slot format indicator RNTI (SFI-RNTI) for slot format instruction, TPC-PUSCH-RNTI for transmit power control (TPC) of physical uplink shared channel (PUSCH), TPC-PUCCH-RNTI for TPC of physical uplink control channel (PUCCH), TPC-SRS-RNTI for TPC of sounding reference signal (SRS), C-RNTI, MCS-C-RNTI, CS-RNTI, and the like.

The CSS used to monitor CRC scrambled DCI with system information-RNTI (SI-RNTI) is also called a type 0-PDCCH CSS, a search space #0, a search space for SIB1, a search space for remaining minimum system information (RMSI), and the like.

The given CORESET whose the number of RBs is determined based on the pdcch-ConfigSIB1 in the MIB may be a CORESET for the type 0-PDCCH CSS. The CORESET for CSS as described above is also called a CORESET #0, a CORESET0, a common CORESET, an initial downlink BWP, and the like.

Note that in the present description, "number of RBs", "size", "bandwidth", and "frequency domain" are used interchangeably and may be replaced with each other. Further, "CORESET #0", "CORESET for the type 0-PDCCH CSS", "initial BWP", and "initial downlink BWP" are used interchangeably and may be replaced with each other.

Incidentally, the UE can avoid configuring the CORESET #0 based on the pdcch-ConfigSIB1 in the MIB. For example, in a cell for NR (for example, a secondary cell) of non-standalone (NSA) (for example, E-UTRA-NR dual connectivity (EN-DC), NR-E-UTRA dual connectivity (NE-DC), or the like), the PBCH (MIB) is broadcast but system information (for example, SIB1, RMSI) is not broadcast, and thus the CORESET #0 does not need to be configured.

When the CORESET #0 is not configured based on the pdcch-ConfigSIB1 in the MIB, a specific value determined based on a given parameter in the MIB (for example, Ssb-subcarrierOffset) may indicate that the SIB1 does not exist, and the CORESET #0 does not exist.

Here, the specific value is, for example, the value of $K_{SSB}$, and may be "30" in a frequency range (frequency range (FR)) 1 (frequency band of 6 GHz or less) and "14" in FR2 (frequency band higher than 24 GHz). A given bit of $K_{SSB}$ (for example, 4 MSB) is constituted of Ssb-subcarrierOffset, and the remaining bits of $K_{SSB}$ (for example, 1 LSB) may be given bits in a PBCH payload. Ssb-subcarrierOffset is a parameter that indicates the frequency domain offset between the SSB and the entire resource block grid in the number of subcarriers.

In this manner, it is also assumed that the CORESET #0 is not configured in NR based on the pdcch-ConfigSIB1 in the MIB. When the CORESET #0 is not configured based on the pdcch-ConfigSIB1 in the MIB, there is a concern that the UE cannot properly control reception processing of PDSCH (for example, at least one of reception, demodulation, decoding, or rate matching) in the initial downlink BWP.

For example, it is assumed that a given field (for example, frequency domain resource assignment) in NR and DCI (DL assignment) specifies a frequency domain resource assigned to PDSCH in the initial downlink BWP. It is assumed that the number of bits in the given field is determined based on the bandwidth of the initial downlink BWP.

Further, in NR, it is assumed that the bandwidth of the initial downlink BWP is also used for bit selection in rate matching (for example, rate matching for low-density parity-check code (LDCP)).

It is assumed that the bandwidth of the CORESET #0 is used as the bandwidth of these initial downlink BWPs. However, when the CORESET #0 is not configured based on the pdcch-ConfigSIB1 in the MIB, the question is how to determine the bandwidth of the initial downlink BWP.

Accordingly, the present inventors have considered a method for appropriately determining the bandwidth of the initial downlink BWP used to determine at least one of the number of bits in a given field that specifies a frequency domain resource assigned to PDSCH in the initial downlink BWP, or rate matching of the PDSCH, and have devised the present invention.

Hereinafter, one embodiment according to the present disclosure will be described in detail with reference to the drawings. Note that the present embodiment may be applied not only to NSA but also to stand-alone NR. Further, in the following, the CORESET #0 assumes a CORESET for the type 0-PDCCH CSS, but is not limited to this.

(First Aspect)

In a first aspect, the UE may determine the number of bits in the given field that indicates the frequency domain resource assigned to PDSCH in the DCI based on whether or not the CORESET #0 (control resource set for the common search space) is configured based on the MIB.

Hereinafter, the given field in the DCI will be called a frequency domain resource assignment field (frequency domain resource assignment), but the name of the given field is not limited to this.

In the first aspect, the UE may determine the number of bits of the frequency domain resource assignment field in the DCI based on the size of the CORESET #0 when the CORESET #0 is configured based on the MIB (for example, the pdcch-ConfigSIB1 in the MIB). Here, the size of the CORESET #0 may be determined based on a given bit (for example, 4 MSB, ControlResourceSetZero) in the pdcch-ConfigSIB1 in the MIB, as described in FIG. 1.

On the other hand, the UE may determine the number of bits in the frequency domain resource assignment field in the DCI based on the size of the initial downlink BWP when the CORESET #0 is not configured based on the MIB (for example, the pdcch-ConfigSIB1 in the MIB).

Here, the size of the initial downlink BWP may be given by a higher layer parameter (for example, a parameter to be RRC-signaled). The higher layer parameter may be specific information (for example, locationAndBandwidth) in information regarding the initial downlink BWP (for example, BWP-DownlinkCommon for initialDownlinkBWP). The information regarding the initial downlink BWP may be included in an RRC message (for example, RRC reconfiguration message) or SIB1.

Figure 2:
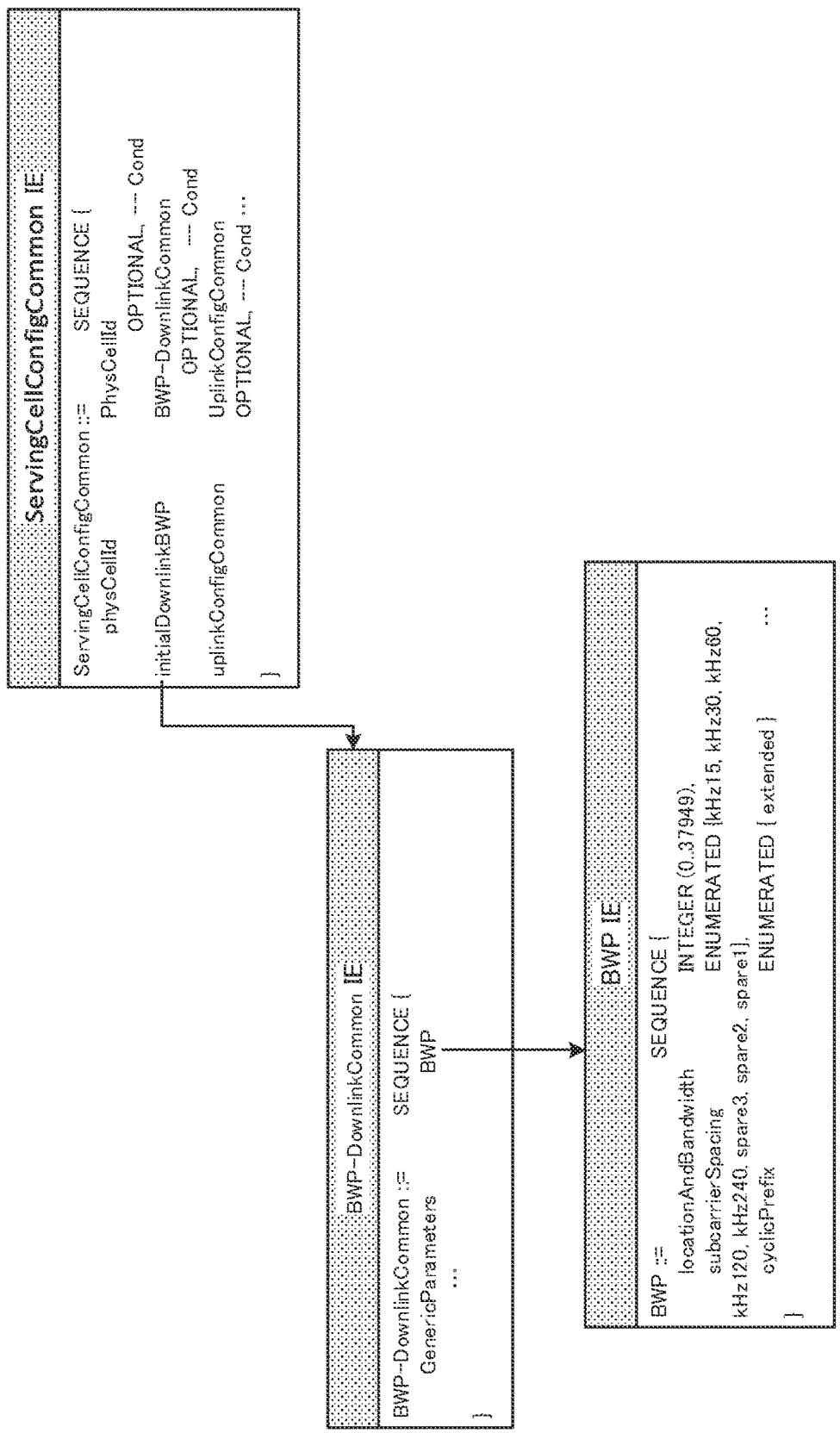
FIG. 2 is a diagram illustrating an example of a configuration of an initial downlink BWP by a higher layer parameter.

FIG. 2 is a diagram illustrating an example of information regarding the initial downlink BWP. As illustrated in FIG. 2, the information regarding the initial downlink BWP (for example, BWP-DownlinkCommon for initialDownlinkBWP) may include information (location/bandwidth information, for example, locationAndBandwidth) used to determine at least one of the location and bandwidth (location/bandwidth) of the frequency domain of the initial downlink BWP. The locationAndBandwidth may be constituted of a given number of bits (for example, 15 bits).

The UE may determine the bandwidth (number of RBs) of the initial downlink BWP based on at least one bit of the locationAndBandwidth. For example, the UE may determine the number of RBs associated with an index indicated by at least one bit of the locationAndBandwidth as the bandwidth of the initial downlink BWP in a table that associates at least the number of RBs with a given index.

As illustrated in FIG. 2, cell-specific parameter configuration information (for example, ServingCellConfigCommon) may include information regarding the initial downlink BWP (for example, initialDownlinkBWP). For initialDownlinkBWP, a cell-specific common parameter (BWP-DownlinkCommon) may be provided. The BWP-DownlinkCommon may include the above-described locationAndBandwidth and the like.

The UE may determine the location/bandwidth of the initial downlink BWP based on the locationAndBandwidth in the BWP-DownlinkCommon provided for the initialDownlinkBWP.

Note that the ServingCellConfigCommon in FIG. 2 may be included in an RRC reconfiguration message. The hierarchical structure of parameters illustrated in FIG. 2 is only an example, and is not limited to the one illustrated in the diagram.

For example, in FIG. 2, the information regarding the initial downlink BWP (for example, the BWP-DownlinkCommon given for the initialDownlinkBWP) is included in the ServingCellConfigCommon, but may be included in any information item (information element (IE)) in any layer. For example, the information regarding the initial downlink BWP may be included in SIB1 (for example, DownlinkConfigCommonSIB in ServingCellConfigCommonSIB in SIB1).

Further, the location/bandwidth information (for example, the locationAndBandwidth) of the initial downlink BWP is included in the BWP-DownlinkCommon given for the initialDownlinkBWP, but may be included in any IE in any layer.

<Controlling Number of Bits in Frequency Domain Resource Assignment Field in DL Assignment>

Figure 3:
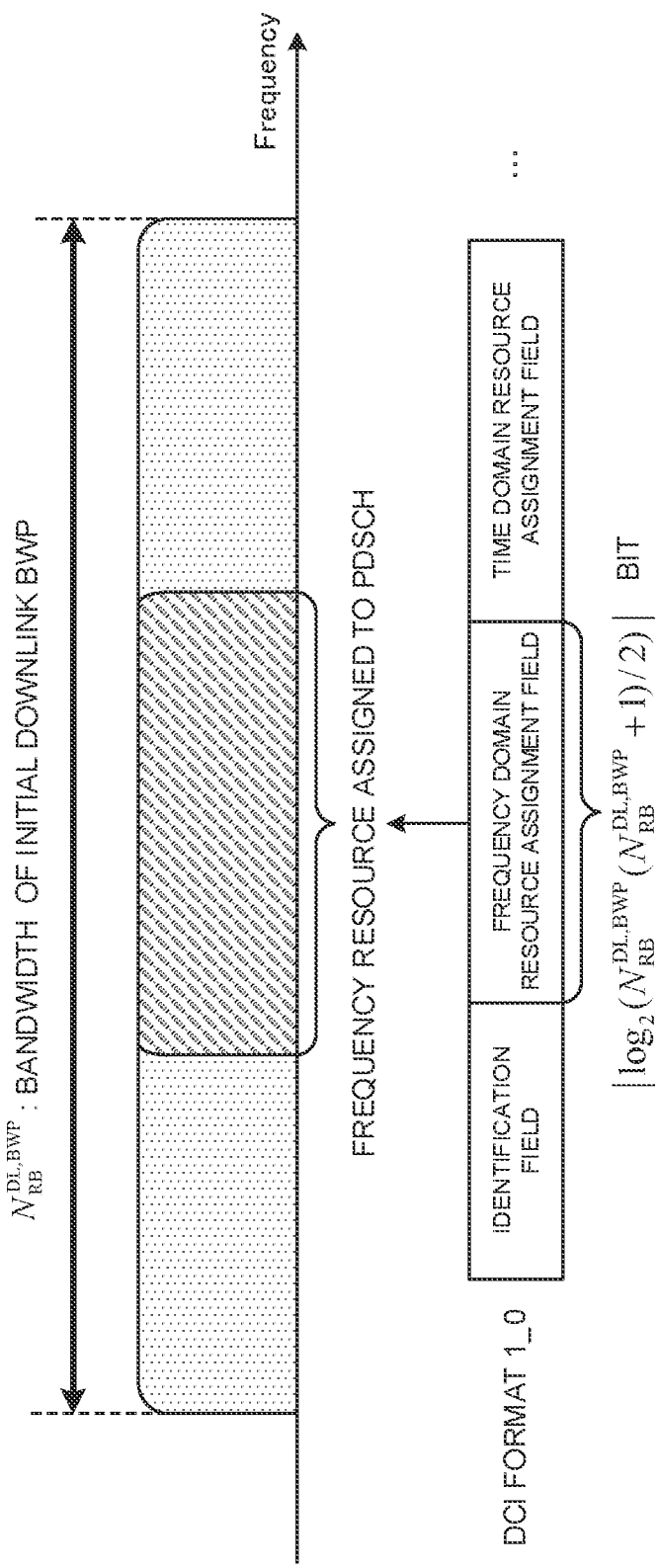
FIG. 3 is a diagram illustrating an example of determining the number of bits of a frequency domain resource assignment field in DL assignment according to a first aspect.

FIG. 3 is a diagram illustrating an example of determining the number of bits of the frequency domain resource assignment field in the DL assignment according to the first aspect. The DL assignment may include at least one of DCI format 1_0 and DCI format 1_1. Although FIG. 3 illustrates DCI format 1_0 as an example of DL assignment, it may be any DCI used for PDSCH scheduling.

Further, the DCI format 1_0 in FIG. 3 may be CRC-scrambled with a given identifier. The given identifier is only required to be at least one of, for example, cell-radio network temporary identifier (C-RNTI), paging-RNTI (P-RNTI), system information-RNTI (SI-RNTI), random access-RNTI (RA-RNTI), or temporary cell-RNTI (TC-RNTI).

As illustrated in FIG. 3, a frequency resource assigned to PDSCH in a bandwidth $N^{DL,BWP}_{RB}$ of the initial downlink BWP is specified by the frequency domain resource assignment field of the DCI format 1_0.

Note that the assignment of the frequency resource to PDSCH in FIG. 3 is merely an example, and discontinuous frequency resources may be assigned to PDSCH. Further, the assignment unit of the frequency resource may be an RB or may be a resource block group (RB) including one or more RBs.

As illustrated in FIG. 3, the number of bits of the frequency domain resource assignment field may be determined based on the bandwidth $N^{DL,BWP}_{RB}$ of the initial downlink BWP. For example, in FIG. 3, the number of bits is determined based on equation (1) below.

[Equation 1]

$$\lceil \log_2(N^{DL,BWP}_{RB}(N^{DL,BWP}_{RB}+1)/2) \rceil \quad \text{Equation (1)}$$

Here, when the CORESET #0 is configured based on the MIB (for example, the pdcch-ConfigSIB1 in the MIB), $N^{DL,BWP}_{RB}$ in equation (1) may have the size of the above CORESET #0. Here, the size of the CORESET #0 may be determined based on a given bit (for example, 4 MSB, ControlResourceSetZero) in the pdcch-ConfigSIB1 in the MIB, as described in FIG. 1.

On the other hand, when the CORESET #0 is not configured based on the MIB (for example, the pdcch-ConfigSIB1 in the MIB), $N^{DL,BWP}_{RB}$ in equation (1) may be the size of the initial downlink BWP (for example, the bandwidth given by the locationAndBandwidth of the above BWP-DownlinkCommon). Note that the bandwidth determination based on at least one bit constituting the locationAndBandwidth is as described above.

Note that equation (1) above is merely an example, and the number of bits in the frequency domain resource assignment field may be determined by using an equation other than equation (1) above. For example, when the DCI format 1_0, which is CRC-scrambled with P-RNTI, transmits a short message, the number of bits in the frequency domain resource assignment field may be determined based on equation (2) below.

[Equation 2]

$$[\lceil \log_2(N^{DL,BWP}_{RB}(N^{DL,BWP}_{RB}+1)/2) \rceil +19] \quad \text{Equation (2)}$$

As described above, in the first aspect, the number of bits of the frequency domain resource assignment field in the DCI is determined based on whether or not the CORSET #0 is configured based on the MIB, and thus the UE can properly control reception of PDSCH assigned by the initial BWP by the DCI.

(Second Aspect)

In a second aspect, the UE may control bit selection in rate matching of PDSCH based on whether or not the CORESET #0 (control resource set for the common search space) is configured based on the MIB. In the second aspect, differences from the first aspect will be mainly described.

In the second aspect, the UE may control the bit selection in rate matching of PDSCH based on the size of the CORESET #0 when the CORESET #0 is configured based on the MIB (for example, pdcch-ConfigSIB1 in the MIB). Here, the size of the CORESET #0 may be determined based on a given bit (for example, 4 MSB, ControlResourceSetZero) in the pdcch-ConfigSIB1 in the MIB, as described in FIG. 1.

On the other hand, the UE may control the bit selection in rate matching of PDSCH based on the size of the initial downlink BWP when the CORESET #0 is not configured based on the MIB (for example, pdcch-ConfigSIB1 in the MIB). Here, the determination of the size of the initial downlink BWP is as described in the first aspect (for example, FIG. 2).

Further, the bit selection in rate matching may be to select a given number of bits (for example, consecutive bits) that matches the resource assigned for transmission (for example, the number of resource elements (REs) available in one or more RBs assigned to PDSCH or PUSCH) from a circular buffer having a given length in which a bit sequence after encoding is stored.

Note that the above rate matching may be, for example, rate matching for LDCP.

Figure 4:
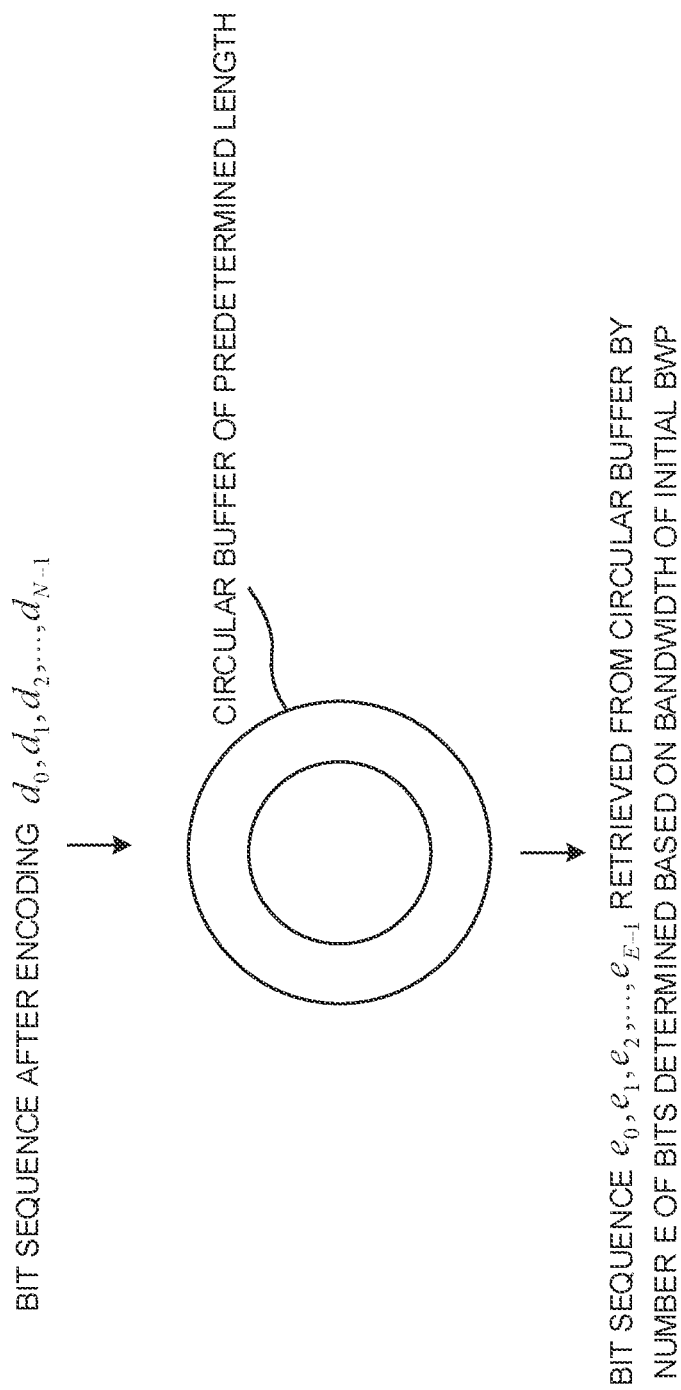
FIG. 4 is a diagram illustrating an example of control of bit selection in rate matching according to a second aspect.

FIG. 4 is a diagram illustrating an example of control of bit selection in rate matching according to the second aspect. Note that the bit selection in rate matching illustrated in FIG. 4 may also be applied to the rate matching of data (also referred to as a transport block, code block, or the like) transmitted by PDSCH assigned to the initial downlink BWP.

As illustrated in FIG. 4, a bit sequence (for example, output bits from an LDCP encoder) $d_0, d_1, \ldots, d_{N-1}$ of the number of bits N after encoding are written to a circular buffer having a given length. The number of bits E retrieved from the circular buffer may be determined based on the bandwidth of the initial downlink BWP.

<Bit Selection of DL-SCH Rate Matching>

Bit selection in rate matching of downlink shared channel (DL-SCH), which is a transport channel mapped to PDSCH, will be described in detail.

In the bit selection in the rate matching of DL-SCH, when the CORESET #0 is configured based on the MIB (for example, pdcch-ConfigSIB1 in the MIB), the number of bits E taken out of the circular buffer in FIG. 4 may be determined based on the size of the CORESET #0.

On the other hand, when the CORESET #0 is not configured based on the MIB (for example, pdcch-ConfigSIB1 in the MIB), the number of bits E retrieved from the circular buffer in FIG. 4 may be determined based on the bandwidth given by the locationAndBandwidth of the BWP-DownlinkCommon for the initialDownlinkBWP.

As described above, in the second aspect, the number of bits E retrieved from the circular buffer in the rate matching of PDSCH is determined based on whether or not the CORSET #0 is configured based on the MIB, and thus the UE can properly control the rate matching of PDSCH assigned to the initial BWP.

(Radio Communication System)

Now, a configuration of a radio communication system according to one embodiment of the present disclosure will be described below. In this radio communication system, communication is performed using one or a combination of the radio communication methods according to the embodiments of the present disclosure.

Figure 5:
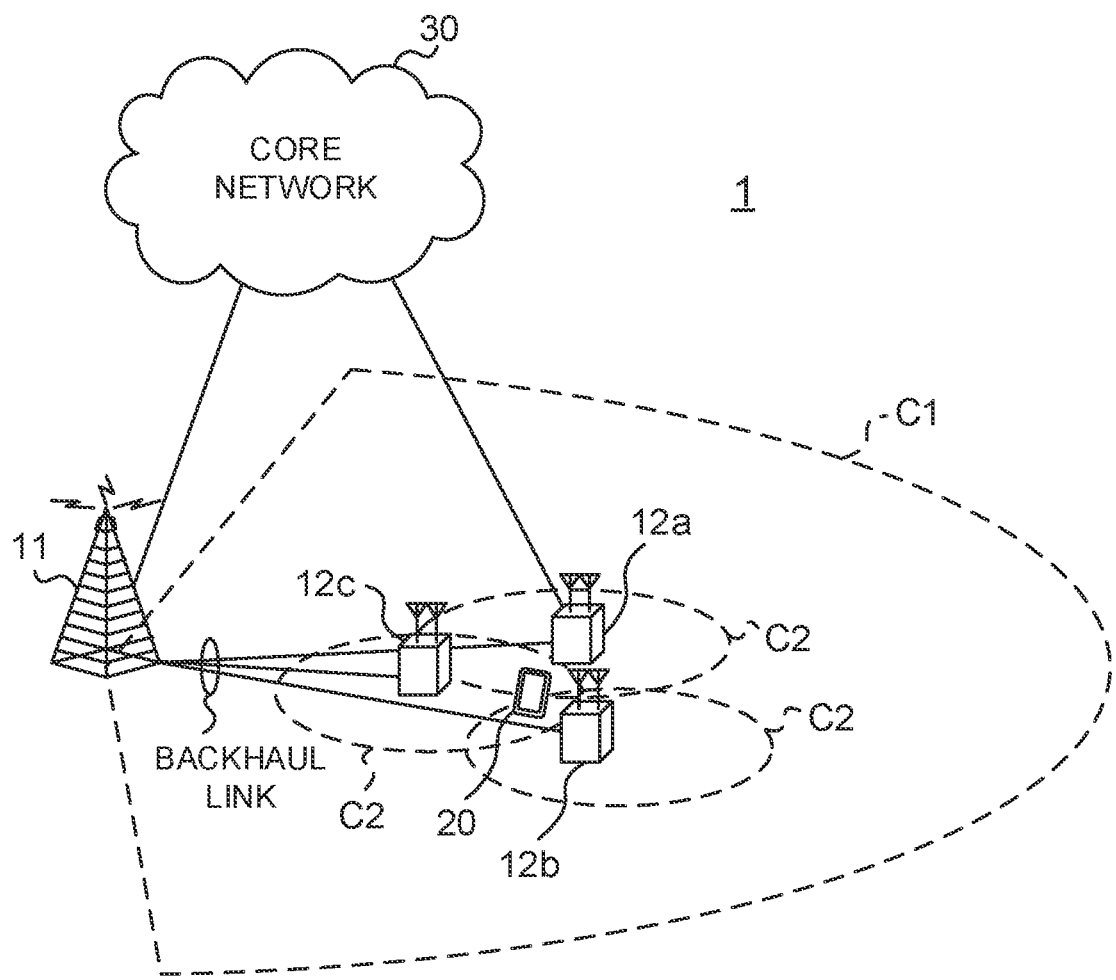
FIG. 5 is a diagram illustrating an example of a schematic configuration of a radio communication system according to one embodiment.

FIG. 5 is a diagram illustrating an example of a schematic configuration of a radio communication system according to one embodiment. A radio communication system 1 may be a system that implements communication using long term evolution (LTE), 5th generation mobile communication system new radio (5G NR), and the like specified by the Third Generation Partnership Project (3GPP).

Further, the radio communication system 1 may support dual connectivity (multi-RAT dual connectivity (MR-DC)) between a plurality of radio access technologies (RATs). MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In EN-DC, an LTE (E-UTRA) base station (eNB) is a master node (MN), and an NR base station (gNB) is a secondary node (SN). In NE-DC, an NR base station (gNB) is MN, and an LTE (E-UTRA) base station (eNB) is SN.

The radio communication system 1 may support dual connectivity between a plurality of base stations in identical RAT (for example, dual connectivity in which both MN and SN are NR base stations (gNB)) (NR-NR dual connectivity (NN-DC)).

The radio communication system 1 may include a base station 11 that forms a macro cell C1 with a relatively wide coverage, and base stations 12 (12a to 12c) that are disposed within the macro cell C1 and that form small cells C2 narrower than the macro cell C1. A user terminal 20 may be located in at least one cell. The arrangement, number, and the like of cells and the user terminals 20 are not limited to the aspects illustrated in the drawings. Hereinafter, the base stations 11 and 12 will be collectively referred to as "base stations 10", unless these are distinguished from each other.

The user terminal 20 may be connected to at least one of the plurality of base stations 10. The user terminal 20 may use at least one of carrier aggregation and dual connectivity (DC) using a plurality of component carriers (CC).

Each CC may be included in at least one of a frequency range 1 (FR1) and a frequency range 2 (FR2). The macro cell C1 may be included in FR1, and the small cell C2 may be included in FR2. For example, FR1 may be a frequency band of 6 GHz or less (sub-6 GHz), and FR2 may be a frequency band higher than 24 GHz (above-24 GHz). Note that the frequency bands, definitions, and the like of FR1 and FR2 are not limited to these, and for example, FR1 may be a frequency band higher than FR2.

Further, the user terminal 20 may perform communication in each CC using at least one of time division duplex (TDD) and frequency division duplex (FDD).

The plurality of base stations 10 may be connected by wire (for example, an optical fiber, an X2 interface, or the like in compliance with common public radio interface (CPRI)) or by radio (for example, NR communication). For example, when NR communication is used as a backhaul between the base stations 11 and 12, the base station 11 corresponding to a higher-level station may be called an integrated access backhaul (IAB) donor, and the base station 12 corresponding to a relay station (relay) may be called an IAB node.

A base station 10 may be connected to a core network 30 via another base station 10 or directly. The core network 30 may include, for example, at least one of evolved packet core (EPC), 5G core network (5GCN), next generation core (NGC), and the like.

The user terminal 20 may correspond to at least one of communication methods such as LTE, LTE-A, and 5G.

In the radio communication system 1, a radio access method based on orthogonal frequency division multiplexing (OFDM) may be used. For example, in at least one of downlink (DL) and uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be called a waveform. Note that in the radio communication system 1, another radio access method (for example, another single carrier transmission method or another multi-carrier transmission method) may be used as the UL and DL radio access method.

In the radio communication system 1, as a downlink channel, a physical downlink shared channel (PDSCH) shared by each user terminal 20, a physical broadcast channel (PBCH), a physical downlink control channel (PDCCH), or the like may be used.

Further, in the radio communication system 1, as an uplink channel, a physical uplink shared channel (PUSCH) shared by each user terminals 20, a physical uplink control channel (PUCCH), a physical random access channel (PRACH), or the like may be used.

User data, higher layer control information, a system information block (SIB), and the like are transmitted by PDSCH. User data, higher layer control information, and the like may be transmitted by PUSCH. Further, a master information block (MIB) may be transmitted by PBCH.

Lower layer control information may be transmitted by PDCCH. The lower layer control information may include, for example, downlink control information (DCI) including scheduling information of at least one of PDSCH and PUSCH.

Note that DCI that schedules PDSCH may be called DL assignment, DL DCI, or the like, and DCI that schedules PUSCH may be called UL grant, UL DCI, or the like. Note that PDSCH may be replaced with DL data, and PUSCH may be replaced with UL data.

A control resource set (CORESET) and a search space may be used to detect PDCCH. The CORESET corresponds to a resource that searches for DCI. The search space corresponds to a search area and a search method for PDCCH candidates. One CORESET may be associated with one or more search spaces. The UE may monitor CORESET associated with a certain search space based on search space configuration.

One SS may correspond to a PDCCH candidate corresponding to one or more aggregation levels. One or more search spaces may be called a search space set. Note that "search space", "search space set", "search space configuration", "search space set configuration", "CORESET", "CORESET configuration", and the like in the present disclosure may be replaced with each other.

By means of PUCCH, channel state information (CSI), delivery confirmation information (for example, hybrid automatic repeat request (HARQ-ACK), which may be called ACK/NACK or the like), scheduling request (SR), and the like may be transmitted. By means of PRACH, a random access preamble for establishing a connection with a cell may be transmitted.

Note that in the present disclosure, downlink, uplink, and the like may be expressed without "link". Further, various channels may be expressed without adding "physical" at the beginning thereof.

In the radio communication system 1, a synchronization signal (SS), a downlink reference signal (DL-RS), and the like may be transmitted. In the radio communication systems 1, a cell-specific reference signal (CRS), a channel state information reference signal (CSI-RS), a demodulation reference signal (DMRS), a positioning reference signal (PRS), a phase tracking reference signal (PTRS), and the like may be transmitted as DL-RS.

The synchronization signal may be, for example, at least one of a primary synchronization signal (PSS) and a secondary synchronization signal (SSS). A signal block including SS (PSS or SSS) and PBCH (and DMRS for PBCH) may be called an SS/PBCH block, an SSB (SS Block), and the like. Note that SS, SSB, or the like may also be called a reference signal.

Also, in the radio communication system 1, a sounding reference signal (SRS), a demodulation reference signal (DMRS), and the like may be transmitted as an uplink reference signal (UL-RS). Note that the DMRS may be called a "user terminal-specific reference signal (UE-specific reference signal)".

(Base Station)

Figure 6:
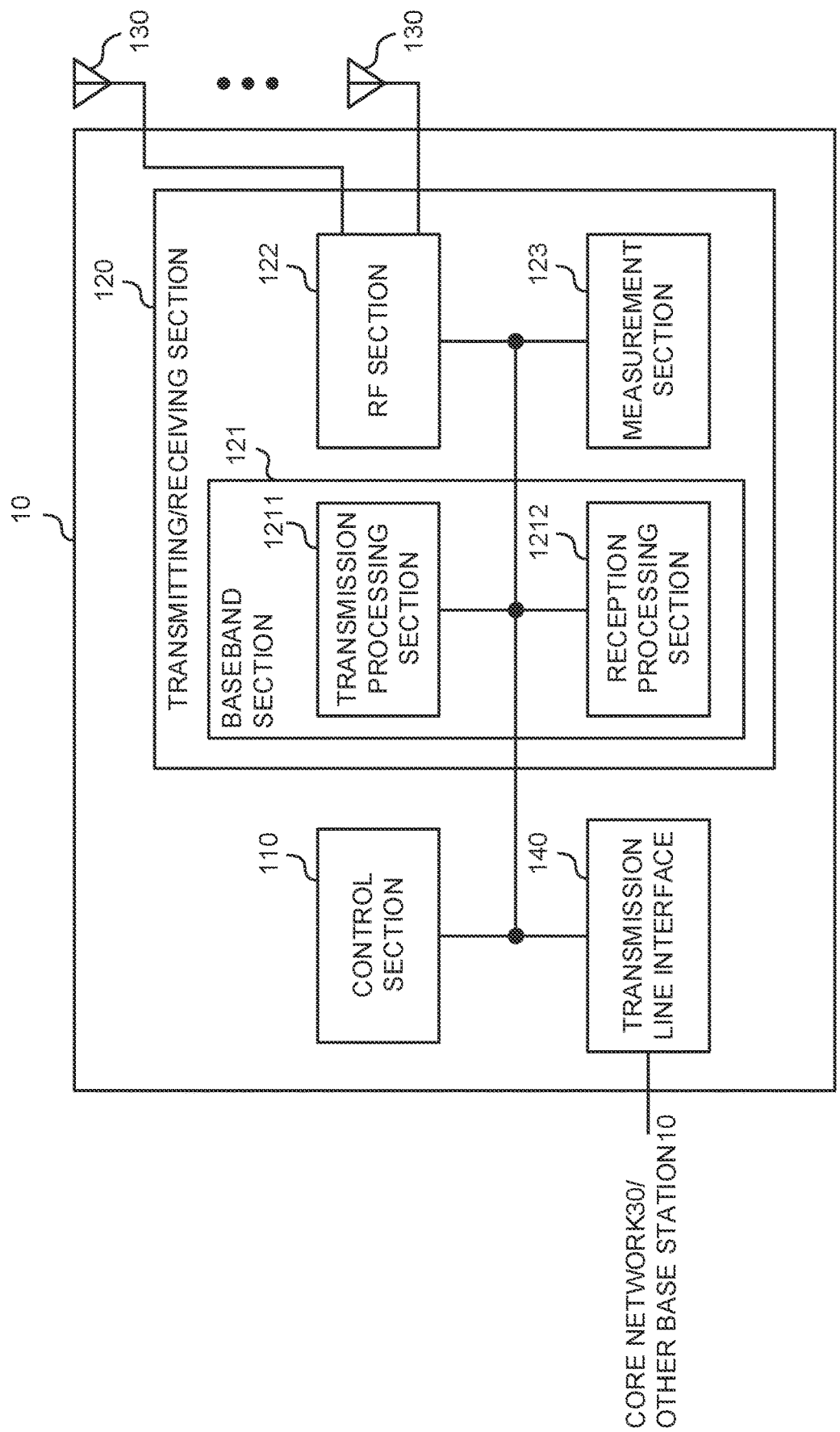
FIG. 6 is a diagram illustrating an example of a configuration of a base station according to one embodiment.

FIG. 6 is a diagram illustrating an example of a configuration of a base station according to one embodiment. The base station 10 includes a control section 110, a transmitting/receiving section 120, a transmission/reception antenna 130, and a transmission line interface 140. Note that one or more of the control sections 110, one or more of the transmitting/receiving sections 120, one or more of the transmission/reception antennas 130, and one or more of the transmission line interfaces 140 may be included.

Note that, although this example will primarily illustrate functional blocks that pertain to characteristic parts of the present embodiment, it may be assumed that the base station 10 has other functional blocks that are necessary for radio communication as well. A part of processing of each section described below may be omitted.

The control section 110 controls the entire base station 10. The control section 110 can be constituted by a controller, a control circuit, or the like, which is described based on common recognition in the technical field to which the present disclosure relates.

The control section 110 may control signal generation, scheduling (for example, resource assignment or mapping), and the like. The control section 110 may control transmission/reception, measurement, and the like using the transmitting/receiving section 120, the transmission/reception antenna 130, and the transmission line interface 140. The control section 110 may generate data to be transmitted as a signal, control information, a sequence, and the like, and may transfer the data, the control information, the sequence, and the like to the transmitting/receiving section 120. The control section 110 may perform call processing (such as configuration or releasing) of a communication channel, management of the state of the base station 10, management of a radio resource, and the like.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can be constituted by a transmitter/receiver, an RF circuit, a baseband circuit, a filter, a phase shifter, a measurement circuit, a transmission/reception circuit, and the like, which are described based on common recognition in the technical field to which the present disclosure relates.

The transmitting/receiving section 120 may be constituted as an integrated transmitting/receiving section, or may be constituted by a transmitting section and a receiving section. The transmitting section may be constituted by the transmission processing section 1211 and the RF section 122. The receiving section may be constituted by the reception processing section 1212, the RF section 122, and the measurement section 123.

The transmission/reception antenna 130 can be constituted by an antenna described based on common recognition in the technical field to which the present disclosure relates, for example, an array antenna or the like.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form at least one of a transmission beam and a reception beam by using digital beam forming (for example, precoding), analog beam forming (for example, phase rotation), and the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like, for example, on data, control information, or the like acquired from the control section 110 to generate a bit string to be transmitted.

The transmitting/receiving section 120 (transmission processing section 1211) may perform transmission processing such as channel encoding (which may include error correction encoding), modulation, mapping, filtering processing, discrete Fourier transform (DFT) processing (if necessary), inverse fast Fourier transform (IFFT) processing, precoding, or digital-analog transform on the bit string to be transmitted, and may output a baseband signal.

The transmitting/receiving section 120 (RF section 122) may perform modulation to a radio frequency band, filtering processing, amplification, and the like on the baseband signal, and may transmit a signal in the radio frequency band via the transmission/reception antenna 130.

Meanwhile, the transmitting/receiving section 120 (RF section 122) may perform amplification, filtering processing, demodulation to a baseband signal, and the like on the signal in the radio frequency band received by the transmission/reception antenna 130.

The transmitting/receiving section 120 (reception processing section 1212) may apply reception processing such as analog-digital transform, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired baseband signal to acquire user data and the like.

The transmitting/receiving section 120 (measurement section 123) may perform measurement on the received signal. For example, the measurement section 123 may perform radio resource management (RRM) measurement, channel state information (CSI) measurement, and the like based on the received signal. The measurement section 123 may measure received power (for example, reference signal received power (RSRP)), received quality (for example, reference signal received quality (RSRQ), signal to interference plus noise ratio (SINR), or signal to noise ratio (SNR)), signal strength (for example, received signal strength indicator (RSSI)), propagation path information (for example, CSI), and the like. The measurement result may be output to the control section 110.

The transmission line interface 140 may transmit/receive a signal (backhaul signaling) to and from an apparatus included in the core network 30, other base stations 10, and the like, and may perform acquisition, transmission, and the like of user data (user plane data), control plane data, and the like for the user terminal 20.

Note that the transmitting section and the receiving section of the base station 10 in the present disclosure may be constituted by at least one of the transmitting/receiving section 120, the transmission/reception antenna 130, and the transmission line interface 140.

Note that the transmitting/receiving section 120 may transmit at least one of the master information block (MIB), the system information block (SIB) 1, or the RRC reconfiguration message in the cell.

Further, the transmitting/receiving section 120 transmits an uplink signal (for example, an uplink control channel, an uplink shared channel, DMRS, or the like). Further, the transmitting/receiving section 120 receives a downlink signal (for example, a downlink control channel, a downlink shared channel, DMRS, downlink control information, a higher layer parameter, or the like). Specifically, the transmitting/receiving section 120 may transmit downlink control information including a given field indicating a frequency domain resource assigned to the downlink shared channel.

The control section 110 may control reception of the downlink shared channel based on whether or not the control resource set for the common search space is configured based on the master information block (MIB).

When the control resource set is configured based on the MIB, the control section 110 may determine the number of bits in the given field based on the size of the control resource set (first aspect).

When the control resource set is not configured based on the MIB, the control section 110 may determine the number of bits in the given field based on the size of the band for initial access determined based on the higher layer parameters (first aspect).

When the control resource set is configured based on the MIB, the control section 110 may control the bit selection in rate matching of the downlink shared channel based on the size of the control resource set (second aspect).

When the control resource set is not configured based on the MIB, the control section 110 may control the bit selection in rate matching of the downlink shared channel based on the size of the band for initial access determined based on the higher layer parameters (second aspect).

(User Terminal)

Figure 7:
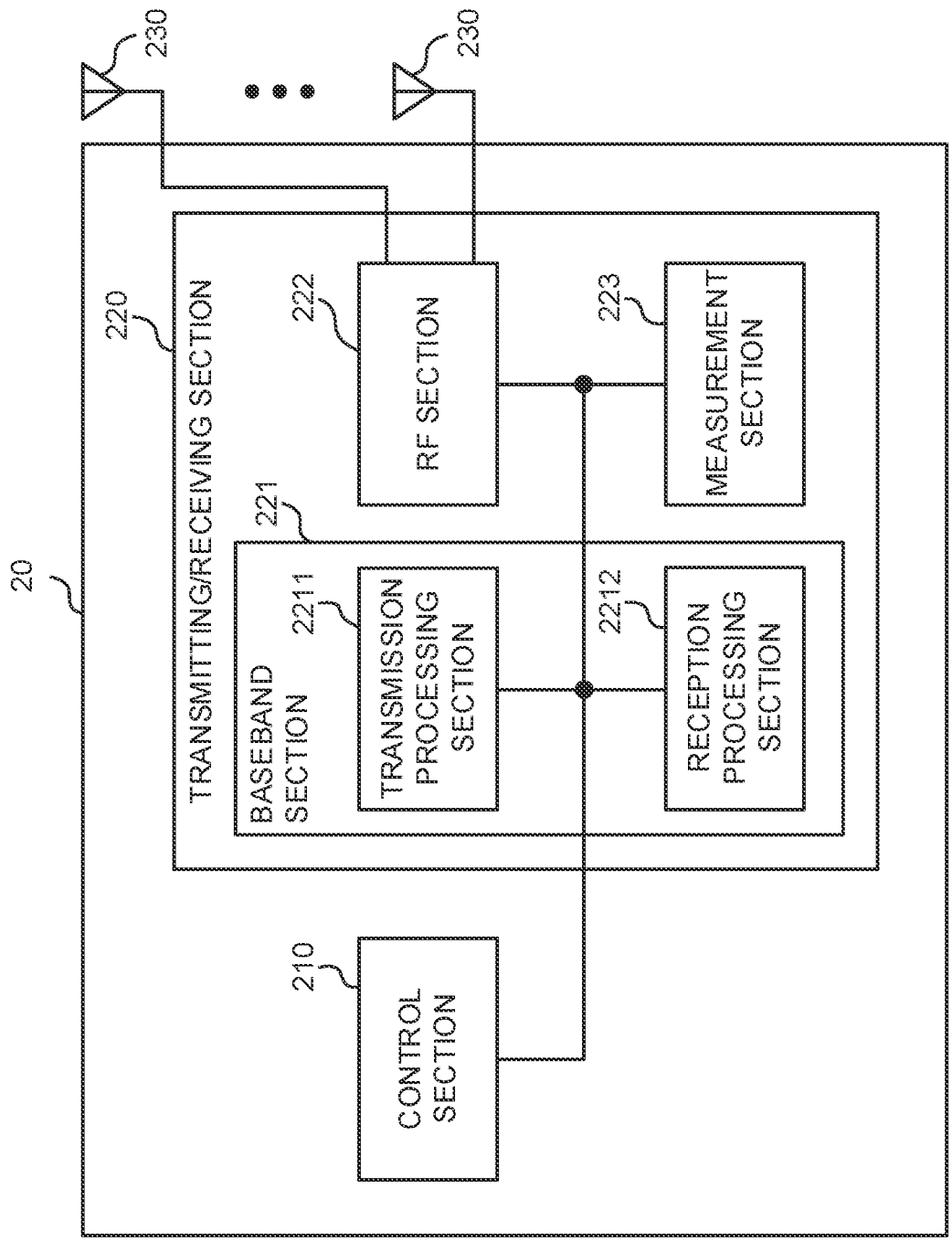
FIG. 7 is a diagram illustrating an example of a configuration of a user terminal according to one embodiment.

FIG. 7 is a diagram illustrating an example of a configuration of a user terminal according to one embodiment. The user terminal 20 includes a control section 210, a transmitting/receiving section 220, and a transmission/reception antenna 230. Note that one or more of the control sections 210, one or more of the transmitting/receiving sections 220, and one or more of the transmission/reception antennas 230 may be included.

Note that, although this example mainly describes a functional block which is a characteristic part of the present embodiment, it may be assumed that the user terminal 20 also has another functional block necessary for radio communication. A part of processing of each section described below may be omitted.

The control section 210 controls the entire user terminal 20. The control section 210 can be constituted by a controller, a control circuit, or the like, which is described based on common recognition in the technical field to which the present disclosure relates.

The control section 210 may control signal generation, mapping, and the like. The control section 210 may control transmission/reception, measurement, and the like using the transmitting/receiving section 220 and the transmission/reception antenna 230. The control section 210 may generate data to be transmitted as a signal, control information, a sequence, and the like, and may transfer the data, the control information, the sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted by a transmitter/receiver, an RF circuit, a baseband circuit, a filter, a phase shifter, a measurement circuit, a transmission/reception circuit, and the like, which are described based on common recognition in the technical field to which the present disclosure relates.

The transmitting/receiving section 220 may be constituted as an integrated transmitting/receiving section, or may be constituted by a transmitting section and a receiving section. The transmitting section may be constituted by the transmission processing section 2211 and the RF section 222. The receiving section may be constituted by the reception processing section 2212, the RF section 222, and the measurement section 223.

The transmission/reception antenna 230 can be constituted by an antenna described based on common recognition in the technical field to which the present disclosure relates, for example, an array antenna or the like.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a transmission beam and a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like, for example, on data, control information, or the like acquired from the control section 210 to generate a bit string to be transmitted.

The transmitting/receiving section 220 (transmission processing section 2211) may perform transmission processing such as channel encoding (which may include error correction encoding), modulation, mapping, filtering processing, DFT processing (if necessary), IFFT processing, precoding, or digital-analog transform on a bit string to be transmitted, and may output a baseband signal.

Note that whether or not to apply DFT processing may be determined based on configuration of transform precoding. When transform precoding is enabled for a channel (for example, PUSCH), the transmitting/receiving section 220 (transmission processing section 2211) may perform DFT processing as the transmission processing in order to transmit the channel using a DFT-s-OFDM waveform. When transform precoding is not enabled for a channel (for example, PUSCH), the transmitting/receiving section 220 (transmission processing section 2211) does not have to perform DFT processing as the transmission processing.

The transmitting/receiving section 220 (RF section 222) may perform modulation to a radio frequency band, filtering processing, amplification, and the like on the baseband signal, and may transmit a signal in the radio frequency band via the transmission/reception antenna 230.

Meanwhile, the transmitting/receiving section 220 (RF section 222) may perform amplification, filtering processing, demodulation to a baseband signal, and the like on the signal in the radio frequency band received by the transmission/reception antenna 230.

The transmitting/receiving section 220 (reception processing section 2212) may acquire user data and the like by applying reception processing such as analog-digital transform, FFT processing, IDFT processing (if necessary), filtering processing, demapping, demodulation, decoding (which may include error correction decoding), MAC layer processing, RLC layer processing, or PDCP layer processing on the acquired baseband signal.

The transmitting/receiving section 220 (measurement section 223) may perform measurement on the received signal. For example, the measurement section 223 may perform RRM measurement, CSI measurement, and the like based on the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

Note that the transmitting section and the receiving section of the user terminal 20 in the present disclosure may be constituted by at least one of the transmitting/receiving section 220, the transmission/reception antenna 230, and the transmission line interface 240.

Note that the transmitting/receiving section 220 may receive at least one of the master information block (MIB), the system information block (SIB) 1, or the RRC reconfiguration message in the cell.

Note that the transmitting/receiving section 220 transmits an uplink signal (for example, an uplink control channel, an uplink shared channel, DMRS, or the like). Further, the transmitting/receiving section 220 receives a downlink signal (for example, a downlink control channel, a downlink shared channel, DMRS, downlink control information, a higher layer parameter, or the like). Specifically, the transmitting/receiving section 220 may transmit downlink control information including a given field indicating a frequency domain resource assigned to the downlink shared channel.

The control section 210 may control reception of the downlink shared channel based on whether or not the control resource set for the common search space is configured based on the master information block (MIB).

When the control resource set is configured based on the MIB, the control section 210 may determine the number of bits in the given field based on the size of the control resource set (first aspect).

When the control resource set is not configured based on the MIB, the control section 210 may determine the number of bits in the given field based on the size of the band for initial access determined based on the higher layer parameters (first aspect).

When the control resource set is configured based on the MIB, the control section 210 may control the bit selection in rate matching of the downlink shared channel based on the size of the control resource set (second aspect).

When the control resource set is not configured based on the MIB, the control section 210 may control the bit selection in rate matching of the downlink shared channel based on the size of the band for initial access determined based on the higher layer parameters (second aspect).

(Hardware Configuration)

Note that the block diagrams that have been used to describe the above embodiments illustrate blocks in functional units. These functional blocks (configuration units) may be implemented in arbitrary combinations of at least one of hardware or software. Also, the method for implementing each functional block is not particularly limited. That is, each functional block may be achieved by a single device physically or logically aggregated, or may be achieved by directly or indirectly connecting two or more physically or logically separate devices (using wires, radio, or the like, for example) and using these plural devices. The functional block may be achieved by combining the one device or the plurality of devices with software.

Here, the functions include, but are not limited to, judging, determination, decision, calculation, computation, processing, derivation, investigation, search, confirmation, reception, transmission, output, access, solution, selection, choosing, establishment, comparison, assumption, expectation, deeming, broadcasting, notifying, communicating, forwarding, configuring, reconfiguring, allocating, mapping, assigning, and so on. For example, a functional block (configuration unit) that causes transmission to function may be called a transmitting section (transmitting unit), a transmitter, or the like. In any case, as described above, the implementation method is not particularly limited.

Figure 8:
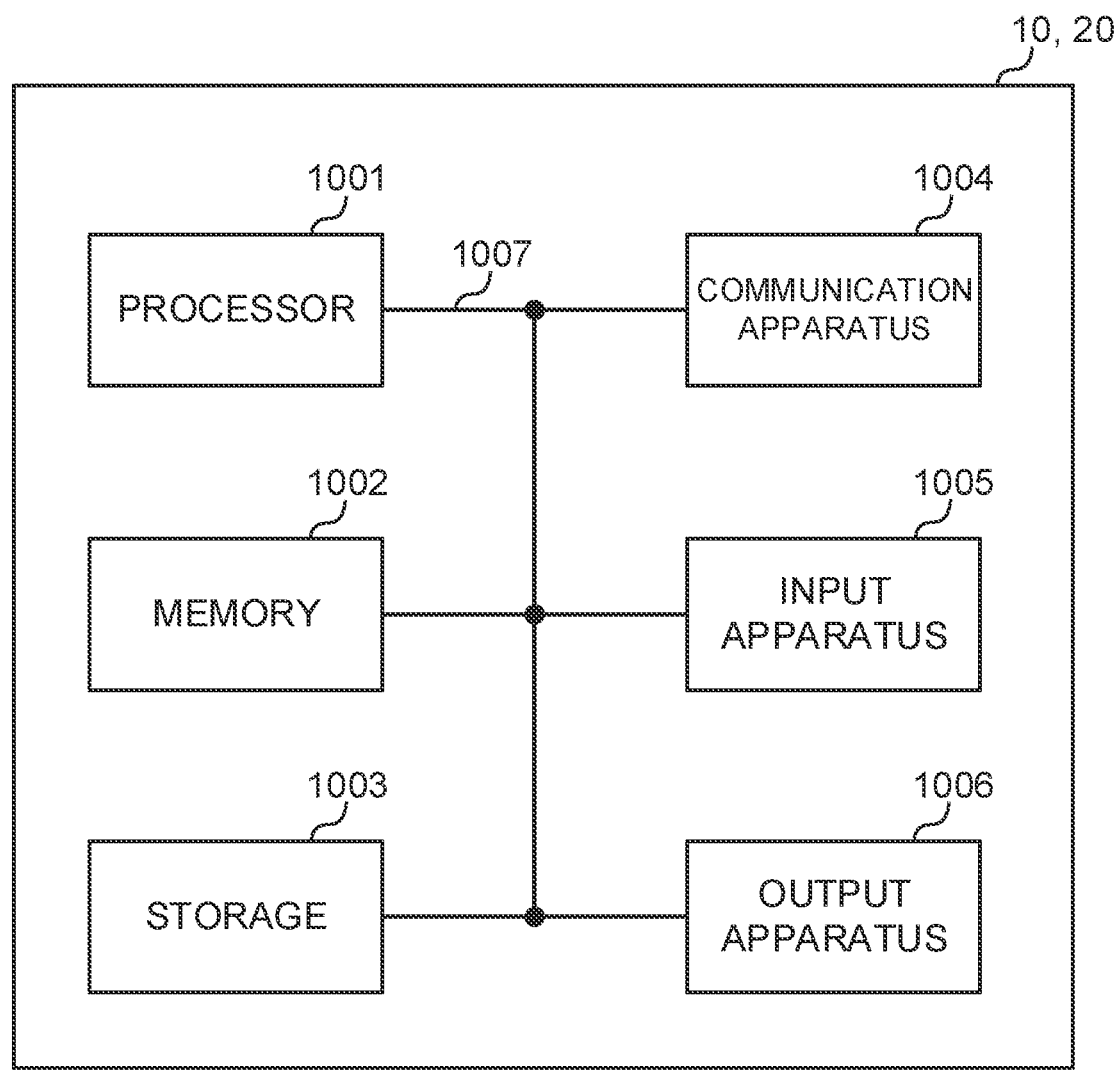
FIG. 8 is a diagram illustrating an example of hardware configurations of a base station and a user terminal according to one embodiment.

For example, the base station, the user terminal, and so on according to one embodiment of the present disclosure may function as a computer that executes the processing of the radio communication method of the present disclosure. FIG. 8 is a diagram illustrating an example of hardware configurations of the base station and the user terminal according to one embodiment. Physically, the above-described base station 10 and user terminal 20 may be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the terms such as an apparatus, a circuit, a device, a section, or a unit can be replaced with each other. The hardware configuration of the base station 10 and the user terminal 20 may be designed to include one or more of the apparatuses illustrated in the drawings, or may be designed not to include some apparatuses.

For example, although only one processor 1001 is illustrated, a plurality of processors may be provided. Furthermore, processing may be executed with one processor, or processing may be executed simultaneously, in sequence, or in different manners, on two or more processors. Note that the processor 1001 may be implemented with one or more chips.

Each function of the base station 10 and the user terminal 20 is implemented by, for example, reading predetermined software (program) into hardware such as the processor 1001 and the memory 1002, and by controlling the operation in the processor 1001, the communication in the communication apparatus 1004, and at least one of the reading or writing of data in the memory 1002 and the storage 1003.

The processor 1001 controls the whole computer by, for example, running an operating system. The processor 1001 may be constituted by a central processing unit (CPU) including an interface with peripheral equipment, a control apparatus, an operation apparatus, a register, and the like. For example, at least a part of the above-described control section 110 (210), transmitting/receiving section 120 (220), and the like may be implemented by the processor 1001.

Furthermore, the processor 1001 reads programs (program codes), software modules, data, and so on from at least one of the storage 1003 or the communication apparatus 1004 into the memory 1002, and executes various processing according to these. As the program, a program to cause a computer to execute at least a part of the operation described in the above-described embodiment is used. For example, the control section 110 (210) may be implemented by a control program that is stored in the memory 1002 and operates in the processor 1001, and another functional block may be implemented similarly.

The memory 1002 is a computer-readable recording medium, and may be constituted of, for example, at least one of a read only memory (ROM), an erasable programmable ROM (EPROM), an electrically EPROM (EEPROM), a random access memory (RAM), or other appropriate storage media. The memory 1002 may be called a "register", a "cache", a "main memory (primary storage apparatus)" and so on. The memory 1002 can store a program (program code), a software module, and the like, which are executable for implementing the radio communication method according to one embodiment of the present disclosure.

The storage 1003 is a computer-readable recording medium, and may be constituted of, for example, at least one of a flexible disk, a floppy (registered trademark) disk, a magneto-optical disk (for example, a compact disc (compact disc ROM (CD-ROM) and the like), a digital versatile disc, a Blu-ray (registered trademark) disc), a removable disk, a hard disk drive, a smart card, a flash memory device (for example, card, stick, and key drive), a magnetic stripe, a database, a server, or other appropriate storage media. The storage 1003 may be called an "auxiliary storage apparatus".

The communication apparatus 1004 is hardware (transmitting/receiving device) for performing inter-computer communication via at least one of a wired network or a wireless network, and may be referred to as, for example, "network device", "network controller", "network card", "communication module", and the like. The communication apparatus 1004 may include a high frequency switch, a duplexer, a filter, a frequency synthesizer, and the like in order to implement, for example, at least one of frequency division duplex (FDD) and time division duplex (TDD). For example, the transmitting/receiving section 120 (220), the transmission/reception antenna 130 (230), and the like described above may be implemented by the communication apparatus 1004. The transmitting/receiving section 120 (220) may be implemented by physically or logically separating the transmitting section 120a (220a) and the receiving section 120b (220b) from each other.

The input apparatus 1005 is an input device for receiving input from the outside (for example, keyboard, mouse, microphone, switch, button, sensor, and the like). The output apparatus 1006 is an output device that performs output to the outside (for example, a display, a speaker, an LED (Light Emitting Diode) lamp, and so on). Note that the input apparatus 1005 and the output apparatus 1006 may have an integrated configuration (for example, touch panel).

Furthermore, these pieces of apparatuses, including the processor 1001, the memory 1002, and the like, are connected by the bus 1007 so as to communicate information. The bus 1007 may be configured with a single bus, or may be configured with buses different between the apparatuses.

Also, the base station 10 and the user terminal 20 may be configured to include hardware such as a microprocessor, a digital signal processor (DSP), an application-specific integrated circuit (ASIC), a programmable logic device (PLD), a field programmable gate array (FPGA), and so on, and part or all of the functional blocks may be implemented by the hardware. For example, the processor 1001 may be implemented with at least one of these pieces of hardware.

Modified Examples

Note that terms described in the present disclosure and terms necessary for understanding the present disclosure may be replaced with other terms that have the same or similar meanings. For example, a channel, a symbol, and a signal (or signaling) may be replaced with each other. Also, the signal may be a message. A reference signal can be abbreviated as an "RS", and may be called a "pilot", a "pilot signal" and so on, depending on which standard applies. Furthermore, a component carrier (CC) may be called a "cell", "frequency carrier", "carrier frequency", or the like.

A radio frame may be formed with one or more periods (frames) in the time domain. Each of the one or more periods (frames) constituting a radio frame may be called a "subframe". Furthermore, a subframe may be formed with one or multiple slots in the time domain. A subframe may be a fixed time duration (for example, 1 ms) that is not dependent on numerology.

Here, the numerology may be a communication parameter applied to at least one of transmission and reception of a certain signal or channel. For example, the numerology may indicate at least one of subcarrier spacing (SCS), a bandwidth, a symbol length, a cyclic prefix length, a transmission time interval (TTI), the number of symbols per TTI, a radio frame structure, specific filtering processing to be performed by a transceiver in the frequency domain, specific windowing processing to be performed by a transceiver in the time domain, and so on.

A slot may be formed with one or more symbols in the time domain (orthogonal frequency division multiplexing (OFDM) symbols, single carrier frequency division multiple access (SC-FDMA) symbols, or the like). Also, a slot may be a time unit based on numerology.

The slot may include a plurality of mini slots. Each mini slot may be formed with one or more symbols in the time domain. Also, a mini slot may be called a "subslot". Each mini slot may be formed with fewer symbols than a slot. A PDSCH (or PUSCH) transmitted in a time unit larger than a mini slot may be called PDSCH (PUSCH) mapping type A. A PDSCH (or PUSCH) transmitted using a mini slot may be called "PDSCH (PUSCH) mapping type B".

A radio frame, a subframe, a slot, a mini slot and a symbol all represent the time unit in signal communication. A radio frame, a subframe, a slot, a mini slot, and a symbol may be each called by other applicable names. Note that time units such as a frame, a subframe, a slot, a mini slot, and a symbol in the present disclosure may be replaced with each other.

For example, one subframe may be called a TTI, a plurality of consecutive subframes may be called a TTI, or one slot or one mini slot may be called a TTI. That is, at least one of the subframe and TTI may be a subframe (1 ms) in the existing LTE, may be a period shorter than 1 ms (for example, one to thirteen symbols), or may be a period longer than 1 ms. Note that the unit to represent the TTI may be called a "slot", a "mini slot" and so on, instead of a "subframe".

Here, a TTI refers to the minimum time unit of scheduling in radio communication, for example. For example, in LTE systems, the base station schedules the radio resources (such as the frequency bandwidth and transmission power that can be used in each user terminal) to assign to each user terminal in TTI units. Note that the definition of TTIs is not limited to this.

The TTI may be the transmission time unit of channel-encoded data packets (transport blocks), code blocks, codewords and so on, or may be the unit of processing in scheduling, link adaptation and so on. Note that when TTI is given, a time interval (for example, the number of symbols) in which the transport blocks, the code blocks, the codewords, and the like are actually mapped may be shorter than TTI.

Note that, when one slot or one mini slot is called a "TTI", one or more TTIs (that is, one or more slots or one or more mini slots) may be the minimum time unit of scheduling. Also, the number of slots (the number of mini slots) to constitute this minimum time unit of scheduling may be controlled.

A TTI having a period of 1 ms may be called a usual TTI (TTI in 3GPP Rel. 8 to 12), a normal TTI, a long TTI, a usual subframe, a normal subframe, a long subframe, a slot, or the like. A TTI that is shorter than the usual TTI may be called a "shortened TTI", "short TTI", "partial TTI" (or "fractional TTI"), "shortened subframe", "short subframe", "mini slot", "sub-slot", "slot", or the like.

Note that a long TTI (for example, a normal TTI, a subframe, or the like) may be replaced with a TTI having a time duration exceeding 1 ms, and a short TTI (for example, a shortened TTI or the like) may be replaced with a TTI having a TTI duration less than the TTI duration of a long TTI and not less than 1 ms.

A resource block (RB) is the unit of resource assignment in the time domain and the frequency domain, and may include one or more consecutive subcarriers in the frequency domain. The number of subcarriers included in the RB may be the same regardless of the numerology, and may be 12, for example. The number of subcarriers included in the RB may be determined based on numerology.

Also, an RB may include one or more symbols in the time domain, and may be one slot, one mini slot, one subframe, or one TTI in length. One TTI, one subframe, and the like each may be formed with one or more resource blocks.

Note that one or more RBs may be called a "physical resource block (PRB (Physical RB))", a "sub-carrier group (SCG)", a "resource element group (REG)", a "PRB pair", an "RB pair" and so on.

Furthermore, a resource block may be constituted of one or more resource elements (REs). For example, one RE may be a radio resource field of one subcarrier and one symbol.

The bandwidth part (BWP) (which may be called a partial bandwidth and the like) may represent a subset of consecutive common resource blocks (RBs) for a certain numerology in a certain carrier. Here, the common RB may be specified by the index of the RB based on a common reference point of the carrier. The PRB may be defined in a BWP and numbered within that BWP.

The BWP may include a BWP for UL (UL BWP) and a BWP for DL (DL BWP). For the UE, one or more BWPs may be configured within one carrier.

At least one of the configured BWPs may be active, and the UE does not need to assume to transmit or receive a predetermined signal/channel outside the active BWP. Note that "cell", "carrier", and the like in the present disclosure may be replaced with "BWP".

Note that the structures of radio frames, subframes, slots, mini slots, symbols and so on described above are merely examples. For example, configurations pertaining to the number of subframes included in a radio frame, the number of slots included in a subframe or radio frame, the number of mini slots included in a slot, the number of symbols and RBs included in a slot or a mini slot, the number of subcarriers included in an RB, the number of symbols in a TTI, the symbol length, the length of cyclic prefixes (CPs) and so on can be variously changed.

Furthermore, the information, parameters, and the like described in the present disclosure may be represented in absolute values, represented in relative values with respect to given values, or represented using other corresponding information. For example, a radio resource may be instructed by a predetermined index.

The names used for parameters and so on in the present disclosure are in no respect limiting. In addition, an equation and so on using these parameters may differ from those explicitly disclosed in the present disclosure. Since various channels (physical uplink control channel (PUCCH), physical downlink control channel (PDCCH), and so on) and information elements can be identified by any suitable names, the various names assigned to these individual channels and information elements are in no respect limiting.

The information, signals, and the like described in the present disclosure may be represented by using a variety of different technologies. For example, data, instructions, commands, information, signals, bits, symbols, chips, and so on that may be referred to throughout the above description may be represented by voltages, currents, electromagnetic waves, magnetic fields or particles, optical fields or photons, or any combination of these.

Also, information, signals, and the like can be output at least either from higher layers to lower layers, or from lower layers to higher layers. Information, signals, and so on may be input and output via a plurality of network nodes.

The information, signals, and so on that are input and/or output may be stored in a specific location (for example, in a memory), or may be managed in a control table. The information, signals, and so on to be input and/or output can be overwritten, updated, or appended. The information, signals, and so on that are output may be deleted. The information, signals, and so on that are input may be transmitted to another apparatus.

Notification of information is by no means limited to the aspects/embodiments described in the present disclosure, and may be performed using other methods. For example, notification of information in the present disclosure may be performed by using physical layer signaling (for example, downlink control information (DCI), uplink control information (UCI), higher layer signaling (for example, radio resource control (RRC) signaling, broadcast information (master information block (MIB), system information block (SIB), or the like), medium access control (MAC) signaling, another signal, or a combination thereof.

Note that physical layer signaling may be called "L1/L2 (Layer 1/Layer 2) control information (L1/L2 control signals)", "L1 control information (L1 control signal)", and the like. Furthermore, the RRC signaling may be called an RRC message, and may be, for example, an RRC connection setup message, an RRC connection reconfiguration message, and the like. Also, MAC signaling may be reported using, for example, MAC control elements (MAC CEs (Control Elements)).

Also, reporting of predetermined information (for example, reporting of information to the effect that "X holds") does not necessarily have to be sent explicitly, and may be sent implicitly (for example, by not reporting this piece of information, or by reporting another piece of information).

Decisions may be made in values represented by one bit (0 or 1), may be made in Boolean values that represent true or false, or may be made by comparing numerical values (for example, comparison with a predetermined value).

Software, whether called "software", "firmware", "middleware", "microcode", or "hardware description language", or called by other names, should be interpreted broadly, to mean instructions, instruction sets, codes, code segments, program codes, programs, subprograms, software modules, applications, software applications, software packages, routines, subroutines, objects, executable files, execution threads, procedures, functions, and the like.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSLs), and the like) or wireless technologies (infrared radiation, microwaves, and the like), at least one of these wired technologies and wireless technologies is also included in the definition of communication media.

The terms "system" and "network" used in the present disclosure may be used interchangeably. The "network" may mean an apparatus (for example, a base station) included in the network.

In the present disclosure, terms such as "precoding", "precoder", "weight (precoding weight)", "quasi-Co-Location (QCL)", "transmission configuration indication state (TCI state)", "spatial relation", "spatial domain filter", "transmission power", "phase rotation", "antenna port", "antenna port group", "layer", "number of layers", "rank", "resource", "resource set", "resource group", "beam", "beam width", "beam angle", "antenna", "antenna element", and "panel" may be used interchangeably.

In the present disclosure, the terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier" may be used interchangeably. The base station may be called by a term such as a macro cell, a small cell, a femto cell, and a pico cell.

A base station can accommodate one or more (for example, three) cells. When a base station accommodates a plurality of cells, the entire coverage area of the base station can be partitioned into a plurality of smaller areas, and each smaller area can provide communication services through base station subsystems (for example, indoor small base stations (Remote Radio Heads (RRHs)). The term "cell" or "sector" refers to all or part of the coverage area of at least one of a base station and a base station subsystem that provides communication services within this coverage.

In the present disclosure, the terms "mobile station (MS)", "user terminal", "user equipment (UE)", "terminal", and the like may be used interchangeably.

A mobile station may be called a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms.

At least one of a base station or a mobile station may be called a transmission apparatus, a reception apparatus, a radio communication apparatus, and the like. Note that at least one of the base station and mobile station may be a device mounted on a moving body, a moving body itself and the like. The moving body may be a transportation (for example, a car, an airplane and so on), an unmanned moving body (for example, a drone, an autonomous car, and so on), or a (manned or unmanned) robot. Note that at least one of the base station and the mobile station also includes a device that does not necessarily move during a communication operation. For example, at least one of the base station and the mobile station may be an IoT (Internet of Things) device such as a sensor.

Furthermore, the base stations in the present disclosure may be replaced with the user terminal. For example, each aspect/embodiment of the present disclosure may be applied to a configuration in which communication between the base station and the user terminal is replaced with communication among a plurality of user terminals (which may be called, for example, D2D (Device-to-Device), V2X (Vehicle-to-Everything), and so on). In this case, the user terminal 20 may be configured to have the functions of the base station 10 described above. In addition, the wording such as "up" and "down" may be replaced with the wording corresponding to the terminal-to-terminal communication (for example, "side"). For example, an uplink channel, a downlink channel, and so on may be replaced with a side channel.

Similarly, the user terminal in the present disclosure may be replaced with a base station. In the case, a configuration in which the base station 10 has the function of the above-described user terminal 20 may be employed.

Certain actions that have been described in the present disclosure to be performed by base stations may, in some cases, be performed by their upper nodes. In a network including one or more network nodes with base stations, it is obvious that various operations that are performed so as to communicate with terminals can be performed by base stations, one or more network nodes (for example, mobility management entities (MMEs), serving-gateways (S-GWs), and the like are conceivable, but these are not limiting) other than base stations, or combinations of these.

The aspects/embodiments described in the present disclosure may be used individually or in combinations, which may be switched depending on the mode of implementation. Furthermore, the order of processing, sequences, flowcharts, and so on that have been used to describe the aspects/embodiments in the present disclosure may be re-ordered as long as inconsistencies do not arise. For example, regarding the methods described in the present disclosure, elements of various steps are presented using an illustrative order, and are not limited to the presented particular order.

The aspects/embodiments described in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New Radio Access Technology (New-RAT), New Radio (NR), New radio access (NX), Future generation radio access (FX), Global System for Mobile communications (GSM; registered trademark), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and/or next generation systems or the like that are enhanced based on these. Further, a plurality of systems may be combined and applied (for example, a combination of LTE or LTE-A and 5G, and the like).

The phrase "based on" as used in the present disclosure does not mean "based only on", unless otherwise specified. In other words, the phrase "based on" means both "based only on" and "based at least on".

Any reference to an element using a designation such as "first", "second", or the like as used in the present disclosure does not generally limit the amount or order of these elements. These designations can be used in the present disclosure, as a convenient way of distinguishing between two or more elements. Thus, references to first and second elements do not mean that only the two elements can be employed, or that the first element must precede the second element in some form.

The terms "judging (determining)" as used in the present disclosure may encompass a wide variety of actions. For example, "judging (determining)" may be interpreted to mean making judgements and determinations related to judging, calculating, computing, processing, deriving, investigating, looking up, search, inquiry (for example, looking up in a table, database, or another data structure), ascertaining, and so on.

Furthermore, to "judge (determine)" as used herein may be interpreted to mean making judgements (determinations) related to receiving (for example, receiving information), transmitting (for example, transmitting information), inputting, outputting, accessing (for example, accessing data in a memory), and so on.

In addition, to "judge (determine)" as used herein may be interpreted to mean making "judgements and determinations" related to resolving, selecting, choosing, establishing, comparing, and so on. In other words, to "judge (determine)" as used herein may be interpreted to mean making "judgements and determinations" related to some action.

In addition, to "judge (determine)" may be replaced with "assuming", "expecting", "considering", and so on.

The term "maximum transmission power" described in the present disclosure may mean the maximum value of transmission power, the nominal UE maximum transmit (transmission) power, or the rated UE maximum transmit (transmission) power.

As used in the present disclosure, the terms "connected" and "coupled", or any variation of these terms, mean all direct or indirect connections or coupling between two or more elements, and can include the presence of one or more intermediate elements between two elements that are "connected" or "coupled" to each other. The coupling or connection between the elements may be physical, logical, or a combination of these. For example, "connection" may be replaced by "access".

As used in the present disclosure, when two elements are connected, these elements can be considered "connected" or "coupled" to each other by using one or more electrical wires, cables, printed electrical connections, and the like, and, as some non-limiting and non-inclusive examples, by using electromagnetic energy having wavelengths in the radio frequency, microwave, and optical (both visible and invisible) domains.

In the present disclosure, the phrase "A and B are different" may mean "A and B are different from each other". Note that the term may mean that "A and B are each different from C". The terms such as "leave", "coupled", and the like may be interpreted as "different".

When the terms such as "include", "including", and variations of these are used in the present disclosure, these terms are intended to be inclusive, in a manner similar to the way the term "comprising" is used. Furthermore, the term "or" as used in the present disclosure is intended to be not an exclusive-OR.

In the present disclosure, for example, where translations add articles, such as a, an, and the in English, the present disclosure may include the plural forms of nouns that follow these articles.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with corrections and modifications, without departing from the spirit and scope of the invention defined by the recitations of claims. Thus, the description of the present disclosure is for the purpose of explaining examples and does not bring any limiting meaning to the invention according to the present disclosure.

The invention claimed is:

1. A terminal comprising:
   a receiver that receives downlink control information including a given field indicating a frequency domain resource assigned to a downlink shared channel; and
   a processor that determines a number of bits of the given field based on a size of a control resource set for a common search space when the control resource set is configured based on a parameter within a master information block (MIB), and determines a number of bits of the given field based on a size of an initial downlink bandwidth part (BWP) when the control resource set is not configured.

2. The terminal according to claim 1, wherein
   the size of the initial downlink BWP is provided by specific information within information regarding the initial downlink BWP, and
   the information regarding the initial downlink BWP is included in a Radio Resource Control (RRC) reconfiguration message or a system information block (SIB) 1.

3. The terminal according to claim 1, wherein the downlink control information is cyclic redundancy check (CRC)-scrambled by Cell (C)-Radio Network Temporary Identifier (RNTI), MCS-C-RNTI, Configured Scheduling (CS)-RNTI or Random Access (RA)-RNTI.

4. The terminal according to claim 1, wherein the processor controls bit selection in rate matching of the downlink shared channel based on the initial downlink BWP.

5. A radio communication method for a terminal, comprising:
   receiving downlink control information including a given field indicating a frequency domain resource assigned to a downlink shared channel;
   determining a number of bits of the given field based on a size of a control resource set for a common search space when the control resource set is configured based on a parameter within a master information block (MIB); and
   determining a number of bits of the given field based on a size of an initial downlink bandwidth part (BWP) when the control resource set is not configured.

6. A base station comprising:
   a transmitter that transmits downlink control information including a given field indicating a frequency domain resource assigned to a downlink shared channel; and
   a processor that determines a number of bits of the given field based on a size of a control resource set for a common search space when the control resource set is configured for a terminal based on a parameter within a master information block (MIB), and determines a number of bits of the given field based on a size of an initial downlink bandwidth part (BWP) when the control resource set is not configured for the terminal.

7. A system comprising a base station and a terminal, wherein:
   the base station comprises:
      a transmitter that transmits downlink control information including a given field indicating a frequency domain resource assigned to a downlink shared channel; and
      a processor that determines a number of bits of the given field based on a size of a control resource set for a common search space when the control resource set is configured for the terminal based on a parameter within a master information block (MIB), and determines a number of bits of the given field based on a size of an initial downlink bandwidth part (BWP) when the control resource set is not configured for the terminal, and
   the terminal comprises:
      a receiver that receives the downlink control information; and
      a processor that determines the number of bits of the given field based on the size of the control resource set when the control resource set is configured based on the parameter, and determines the number of bits of the given field based on the size of the initial downlink BWP when the control resource set is not configured.

8. The terminal according to claim 2, wherein the downlink control information is cyclic redundancy check (CRC)-scrambled by Cell (C)-Radio Network Temporary Identifier (RNTI), MCS-C-RNTI, Configured Scheduling (CS)-RNTI or Random Access (RA)-RNTI.

9. The terminal according to claim 2, wherein the processor controls bit selection in rate matching of the downlink shared channel based on the initial downlink BWP.

10. The terminal according to claim 3, wherein the processor controls bit selection in rate matching of the downlink shared channel based on the initial downlink BWP.

* * * * *